US006657971B1

United States Patent
Costa

(10) Patent No.: US 6,657,971 B1
(45) Date of Patent: Dec. 2, 2003

(54) ISDN PRI LOOP DETECTION AND CORRECTION

(75) Inventor: Robert Brian Dalla Costa, Winfield, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/427,322

(22) Filed: Oct. 26, 1999

(51) Int. Cl.[7] .................................................. H04L 1/00
(52) U.S. Cl. ...................... 370/249; 370/248; 370/247; 370/251; 370/904; 379/22.01; 375/221
(58) Field of Search ................................ 370/249, 904, 370/522, 464, 264, 524, 271, 224, 241, 241.1, 242, 243, 244, 245, 246, 247, 248, 250–252, 254, 255; 379/22.01; 375/221

(56) References Cited

U.S. PATENT DOCUMENTS

| | | | | |
|---|---|---|---|---|
| 5,185,741 A | * | 2/1993 | Iguchi et al. ............... 370/384 |
| 5,187,705 A | * | 2/1993 | Mano ........................ 370/244 |
| 5,331,629 A | * | 7/1994 | Tabata et al. ............... 370/524 |
| 5,422,876 A | * | 6/1995 | Turudic ...................... 370/249 |
| 5,631,958 A | * | 5/1997 | Reese et al. ............ 379/406.06 |
| 5,825,849 A | * | 10/1998 | Garland et al. .......... 379/22.01 |
| 6,134,224 A | * | 10/2000 | Reese et al. ................ 370/286 |
| 6,430,162 B1 | * | 8/2002 | Reese et al. ................ 370/286 |

* cited by examiner

Primary Examiner—Dang Ton
Assistant Examiner—Tri H. Phan

(57) ABSTRACT

A technique for detecting and responding to a loopback condition on an ISDN PRI of a telecommunications switching system. The technique involves storing the Call Reference Value of the most recently transmitted call SETUP command as the Last Sent CRV. An incoming call SETUP command is considered to have looped back when it is assigned a Call Reference Value identical to the Last Sent CRV, and it requests a PRI channel that is occupied. The PRI is considered to be in a loopback condition after a predetermined number of call SETUP commands have looped back. The PRI can be removed from service while the loopback condition persists.

6 Claims, 4 Drawing Sheets

ISDN PRI LOOP DETECTION AND CORRECTION

BACKGROUND OF THE INVENTION

1. Field of the Invention

The present invention relates generally to ISDN telecommunications. In particular, the present invention relates to a method and apparatus for detecting a loopback condition on an ISDN PRI, and compensating for the loopback condition to prevent the failure of calls.

2. Background Art

Integrated Services Digital Network ("ISDN") has become increasingly popular in recent years, as use of the Internet and demand for digital communications among users has increased. ISDN offers users drastically increased data transmission rates compared to analog telephone lines. Additionally, ISDN offers capabilities that simply are not possible with conventional analog telephone service, such as fast call setup time, enhanced telephone functionality, and the simultaneous use of numerous types of digital services, such as telephone, fax, computer, or video conferencing, on a single ISDN connection.

While users are increasingly attracted to the capabilities of ISDN communications, it remains crucial for network service providers to uphold the expectation of reliability that users have developed with conventional analog telephone systems. Moreover, network downtime typically results directly in lost revenues for a service provider due to fewer billable connection completions. Accordingly, modern network service providers place great value on features that increase the reliability of a communications network, and reduce the number failed connection attempts.

Failed connections that many network service providers face is attributed to the necessary maintenance and testing of network transmission equipment. Network transmission equipment is commonly used for such purposes at the interconnection of multiple switching systems, or the multiplexing of numerous data lines onto a high-speed line for long-distance transmission. Typically, while transmission equipment undergoes maintenance or testing, ISDN Primary Rate Interface ("PRI") connections are placed into a "loopback" mode, in which data received by the transmission equipment on any PRI is immediately looped back out onto the same PRI, rather than being routed through to its intended destination. Because a PRI is a high-bandwidth connection, which typically contains communications from large numbers of users and services simultaneously, even a single looped-back PRI can result in service disruption to numerous users.

Traditionally, network service providers have attempted to reduce the number of aborted and/or incomplete calls due to maintenance and testing by reducing both the frequency with which maintenance and testing is necessary, and the time required to perform the necessary repair and maintenance activities. However, such efforts fail to prevent aborted calls and/or disrupted communications on those occasions during which hardware testing and maintenance is still required. Furthermore, in the event that maintenance personnel forget or otherwise fail to remove transmission equipment from maintenance mode upon completion of their activities, service may continue to be disrupted for a substantial time period.

Accordingly, it is an object of this invention to improve the reliability of ISDN communications by providing a method and apparatus whereby an ISDN communications system can detect when a PRI is in a loopback condition.

It is a further object of this invention to prevent the placement of outgoing calls onto a PRI that is in a loopback condition.

Yet another object of this invention is to allow the rerouting of calls from a looped-back PRI to a functional PRI.

It is also an object of this invention to implement the loopback detection and avoidance functionality in the switching system software to avoid the material expense of hardware upgrade and modification. Furthermore, it is intended that this invention will function properly with pre-existing network transmission systems without requiring upgrade or modification thereto.

These and other objects of the present invention will become apparent to those of ordinary skill in the art in light of the present specifications, drawings and claims.

SUMMARY OF THE INVENTION

The present invention includes a telecommunications switching system with one or more ISDN PRIs. Each PRI consists of a plurality of channels, according to the ISDN protocol. For each call initiated by the switching system, a call SETUP command is transmitted. Each call SETUP command is assigned a Call Reference Value ("CRV") and requests a particular channel on the PRI.

Each time the switching system initiates a new call, the CRV assigned to the call SETUP command is stored as the Last Sent CRV. Upon receipt of an incoming call SETUP command, the switching system determines whether its CRV is the same as that stored as the Last Sent CRV. If an incoming SETUP is assigned the same CRV as the Last Sent CRV, and requests a channel on the PRI that is currently occupied, the incoming SETUP is considered likely to have looped back on the PRI.

Each time an incoming SETUP command is considered likely to have looped back on the PRI, a Loop Counter is incremented. When the Loop Counter exceeds a predetermined threshold value, the switching system determines that a loopback condition exists on the PRI.

The loop counter can be reset to zero when the switch receives positive indication that the PRI is not in a loopback condition. Such positive indications include the receipt of a valid response to an outgoing call SETUP command, the receipt on an incoming call SETUP command with a CRV differing from the Last Sent CRV, or the receipt of an incoming call SETUP command requesting a PRI channel that is not occupied.

When the switching system determines that the PRI is in a loopback condition, the PRI may be removed from service. The switching system does not attempt to initiate new calls on the PRI, and calls can be redirected onto alternative PRIs, if available. The switching system may thereafter attempt periodically to bring the PRI back into service, such that call traffic can resume upon correction of the loopback condition.

DETAILED DESCRIPTION OF THE DRAWINGS

Figure 1:
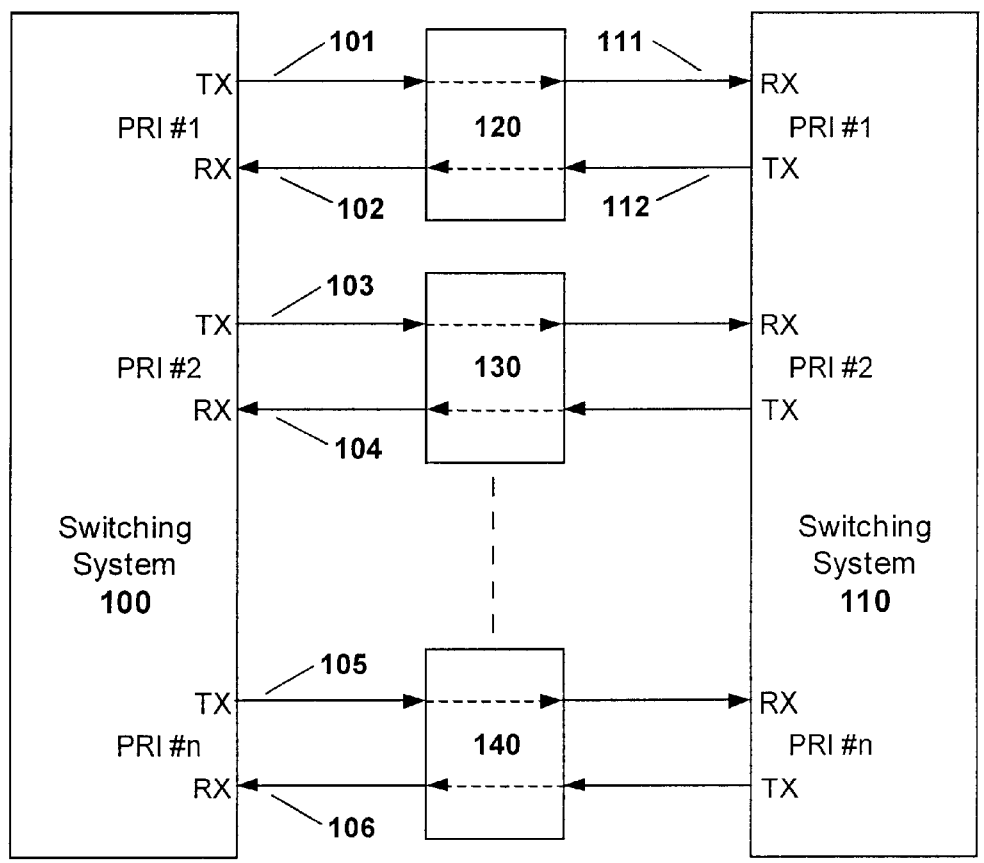
FIG. 1 is a block diagram of two ISDN switching systems interconnected by multiple ISDN PRIs through network transmission equipment.

While this invention is susceptible to embodiment in many different forms, there are shown in the drawings and will be described in detail herein specific embodiments, with the understanding that the present disclosure is to be considered as an exemplification of the principle of the invention and is not intended to limit the invention to embodiments illustrated.

FIG. 1 depicts a portion of an ISDN communications network, including a first switching system 100 with a plurality of PRIs, including lines 101 and 102, lines 103 and 104, and lines 105 and 106. The network of FIG. 1 further includes a second switching system 110, which also contains a plurality of ISDN PRIs. Switching systems 100 and 110 are interconnected via transmission equipment subsystems 120, 130, and 140. Switching systems 100 and 110 may be based upon a variety of hardware platforms known in the art, such as the Lucent 5ESS. Similarly, transmission subsystems are known in the art, may be of varied type and function, and are available from a variety of manufacturers.

During normal operation, switch 100 may originate a call by transmitting a SETUP command onto line 101. The command is transmitted via transmission subsystem 120 and received into switch 110 on line 111. When the call is received, switch 110 may transmit an acknowledgement or response onto line 112, which is in turn transmitted through transmission subsystem 120 and received by switch 100 on line 102. Accordingly, communications can be successfully conducted between the switching systems.

Figure 2:
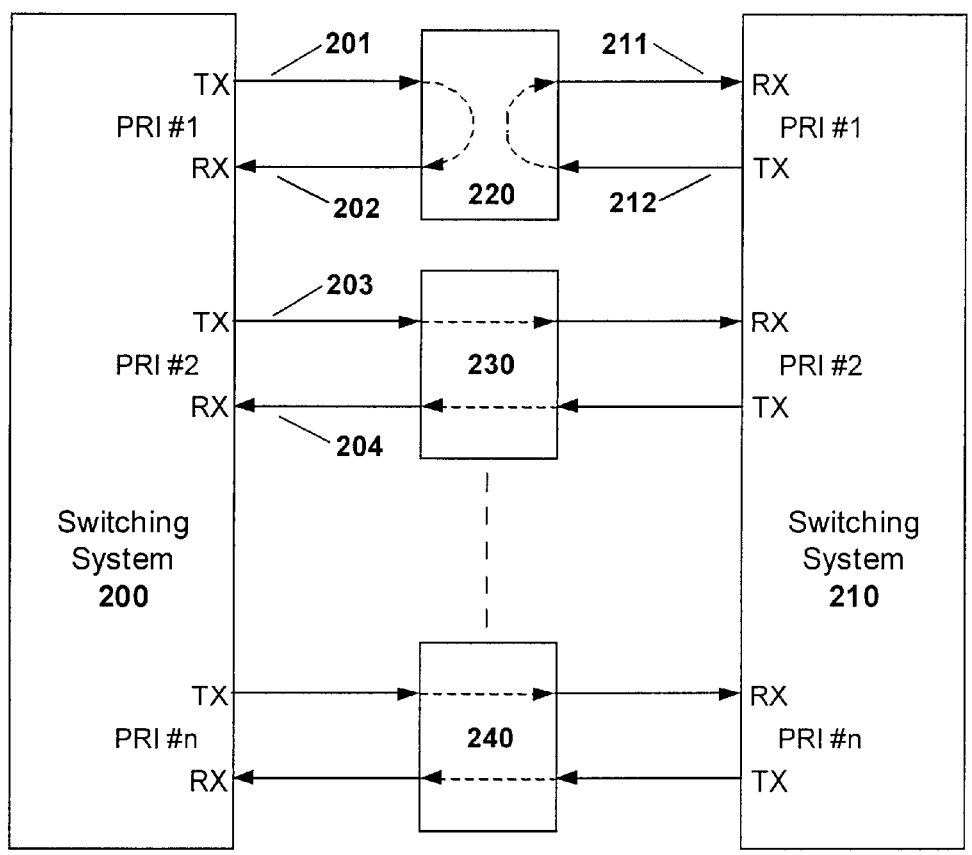
FIG. 2 is a block diagram of two ISDN switching systems interconnected by multiple ISDN PRIs through network transmission equipment, including one transmission subsystem that is placed in a loopback maintenance mode.

When transmission equipment undergoes maintenance or testing, the hardware is typically placed into a loopback mode for the duration of the procedure. FIG. 2 depicts an ISDN communications system in which transmission subsystem 220 is in a loopback mode while undergoing maintenance. Communications coming into subsystem 220 from the switching systems via lines 201 and 212 are looped back onto lines 202 and 211, respectively.

Figure 3:
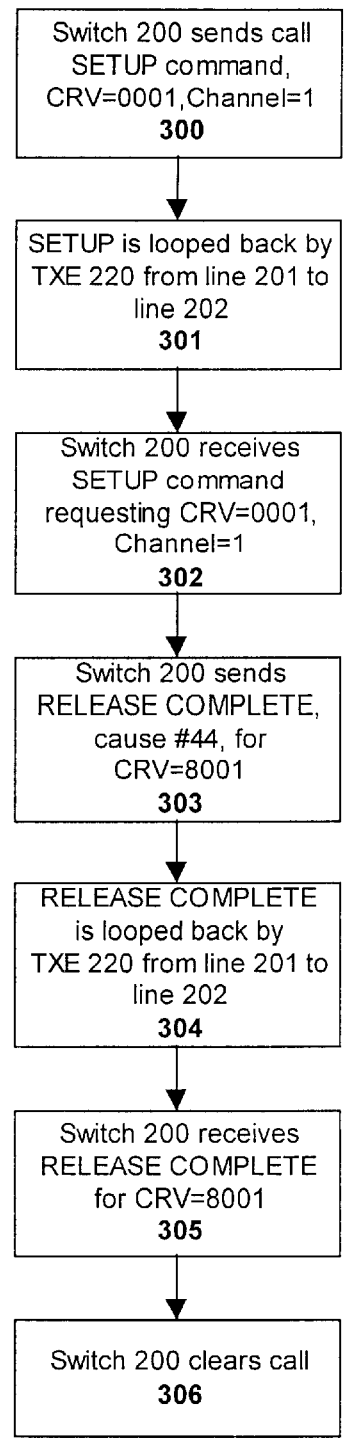
FIG. 3 is a flowchart describing the response of a prior art ISDN switching system to a PRI loopback condition.

Transmission subsystems are typically placed into a loopback mode without notifying the associated switches that the affected PRIs will be out of service. FIG. 3 comprises a flowchart depicting operation and failure of prior art switching systems in the configuration of FIG. 2 in a loopback condition.

In step 300, a new call is initiated by switching system 200 whereby switch 200 transmits a SETUP command onto line 201. The call is assigned a Channel and a Call Reference Value ("CRV") by the originating switch 200, according to a pattern or protocol known in the art of ISDN switching. For purposes of the example of FIG. 3, the call is assigned to Channel 1, with a CRV of 0001.

Next, the SETUP command is received by transmission subsystem 220, and immediately looped back onto line 202, step 301. In step 302, switch 200 receives a SETUP command requesting initiation of a call on Channel 1, with a CRV of 0001—the very same SETUP command that switch 200 just sent. Switch 200 receives the looped back SETUP command, which appears as if it has been sent by another switching system. Switch 200 flips the CRV flag, causing the CRV to change from 0001 to 8001 pursuant to standard ISDN protocol. A CRV flag bit value of zero indicates that the switch sending a message originated the corresponding call. A CRV flag bit value of one indicates that the switch sending a message was the call destination. Therefore, a single CRV can be considered unique and available, and therefore can be simultaneously utilized, by two communicating switches due to the difference in CRV flag values.

Switch 200 then determines that the requested channel is not available due to Switch 200's recent initiation of a call to which the same channel is assigned. Accordingly, switch 200 transmits a RELEASE COMPLETE command, with cause #44, for CRV 8001 onto line 201, step 303. Cause #44 indicates that the call was released because the requested channel is not available. The RELEASE COMPLETE command is also looped back by transmission subsystem 220 from line 201 onto line 202 in step 304. Switch 200 receives the RELEASE COMPLETE command for CRV 8001, step 305, as if it was sent by the switching system to which switch 200's original SETUP command was directed. Switch 200 flips the CRV flag again to 0001, per standard ISDN protocol. Finally, in step 306, switch 200 clears the call that it attempted to initiate on Channel 1 with CRV 0001, as directed by the RELEASE COMPLETE command that appeared to originate from the intended destination switching system.

With prior art switching systems, the above-described cycle repeats for each call that switch 200 initiates while transmission subsystem 220 remains in loopback operation. Accordingly, each attempted call is promptly terminated. Because switch 200 is not aware that subsystem 220 is looped back, it continues to attempt to initiate calls on PRI lines 201 and 202, rather than redirecting calls to a functional PRI, such as that comprised of lines 203 and 204. ISDN users therefore are unable to initiate connections throughout the duration over which transmission subsystem 220 remains in maintenance or testing mode. Users will likely become dissatisfied with the quality of service they are receiving, and important calls and data transmissions may fail with potentially damaging consequences.

The above-described cycle of failure during transmission equipment maintenance and repair can be avoided through the implementation of the present invention. By implementing this invention within the switching system software, which is the preferred embodiment, the problems of transmission equipment loopback can be minimized without the trouble and expense of making hardware modifications to the switch. Furthermore, the preferred solution will operate in conjunction with most brands and types of transmission equipment without any modification thereto.

Figure 4:
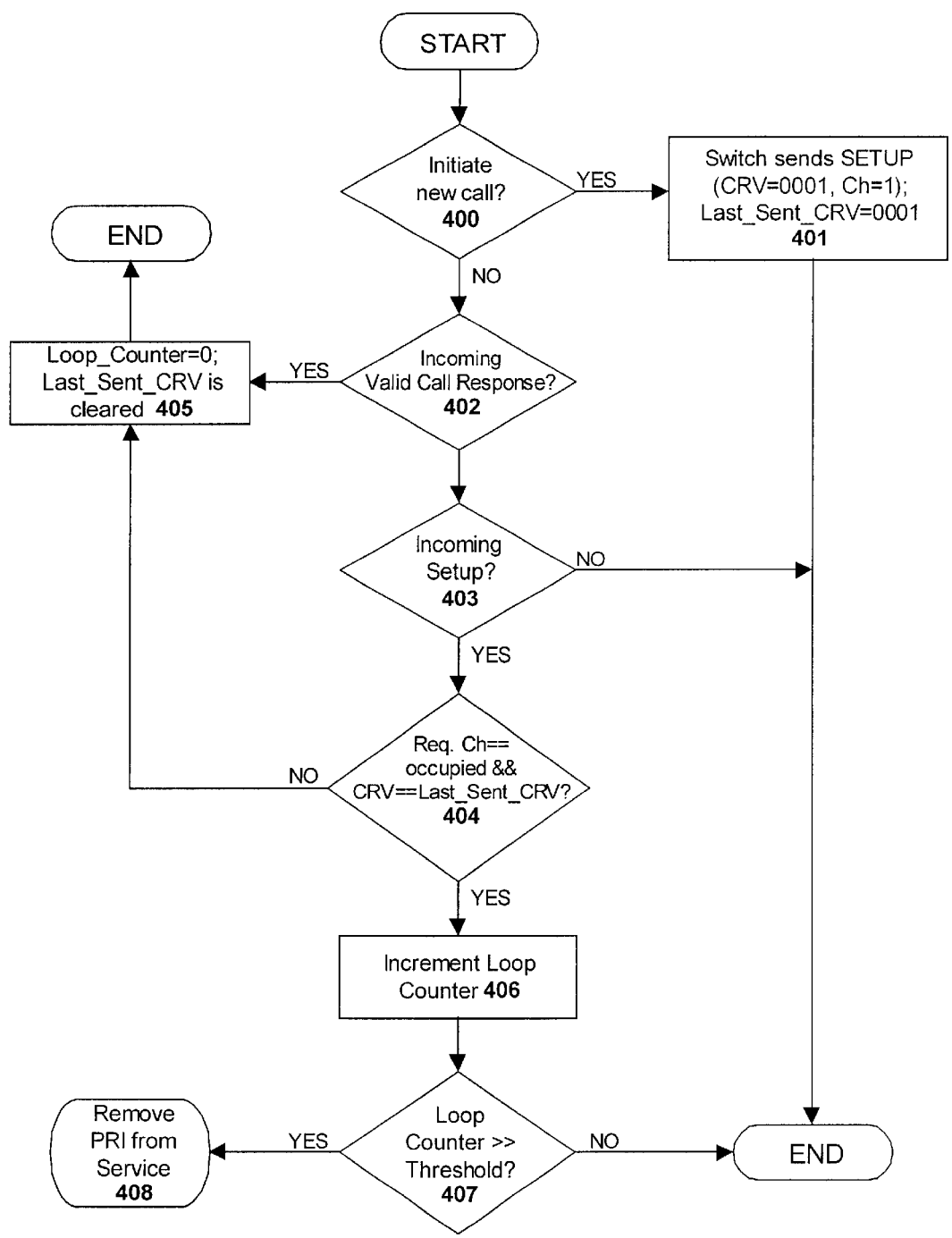
FIG. 4 is a flowchart describing the operation of the present invention.

The flowchart of FIG. 4 describes a cycle of operation of one embodiment of the invention, which is repeated during the course of switching system operation. While FIG. 4 depicts a serial flow of operation, it is understood that one of ordinary skill in the art could readily adapt the steps and features of operation to achieve analogous parallel implementations.

The present invention requires the maintenance of two additional registers compared to a typical switching system implementation. Those registers are a Loop_Counter, which maintains a count of the number of call SETUP messages suspected of having been looped back, and the Last_Sent_CRV, which stores the CRV of the SETUP command most recently transmitted by the switch.

In step 400, the switch determines whether a new call is to be initiated. If so, the switching system transmits a SETUP command with CRV and channel values assigned according to common protocols known in the art in step 401. The cycle is then restarted.

When a new call is not to be initiated, the switch detects whether a valid call response to an outgoing SETUP is being received, step 402. A valid call response includes CALL PROCEEDING, ALERTING, or CONNECT messages—messages which could only be received when a PRI is not in loopback. When a valid call response is received, step 405, the switch determines that the PRI is not currently looped back, the Loop_Counter register is reset to zero, and the Last_Sent_CRV register is cleared. By resetting the Loop_Counter when the switch receives a communication indicating that a PRI is not looped back, the chance of falsely detecting loopback is reduced.

If a valid call response is not received, the switch checks for an incoming SETUP command on the PRI, step 403. If an incoming SETUP is received, the switch determines whether both the SETUP's requested channel is currently occupied, and whether the incoming SETUP CRV is the same as the value stored in the Last_Sent_CRV register, step 404. If both of those conditions are true, then it is very likely that the SETUP command originated from the same switch, and is being looped back.

While a positive determination in step 404 will normally occur only while the PRI is in loopback, there may exist the possibility that another switch will have transmitted a SETUP with a CRV equal to the Last_Sent_CRV that requests an occupied channel. To avoid erroneously removing a PRI from service, the preferred embodiment of FIG. 4 further incorporates a Loop_Counter. The Loop_Counter ensures that a PRI is not removed from service until the switch receives a plurality of consecutive SETUP commands that appear to have looped back.

Accordingly, a positive determination in step 404 will cause the Loop_Counter value to increment, step 406. The switch then determines whether the value stored in the Loop_Counter has exceeded a predetermined threshold value, step 407. The threshold value can be chosen by the switch manufacturer or service provider according to desired service priorities. A lower threshold value provides quicker response to a loopback condition, with correspondingly fewer failed call attempts, but also results in a greater likelihood of erroneously removing an active PRI from service. By contrast, a higher threshold value greatly decreases the risk of erroneously removing a PRI from service, but increases the number of attempted calls that will fail before a PRI is properly removed from service. If the Loop_Counter value exceeds the predetermined threshold, the PRI is deemed to be in loopback, and is accordingly removed from service in step 408.

After the switch detects that a PRI is in loopback, the process of removing the PRI from service is performed according to existing procedures, known within the field of ISDN switching systems. Software currently known in the art, and commonly implemented in switching systems, prevents call attempts on an out-of-service PRI. Calls that would otherwise have been directed to the out-of-service PRI are instead redirected for successful completion. Switch software may also generate an output message to warn a service provider that a PRI has been removed from service, so that the loopback condition can be rectified by the network service provider if its existence was otherwise unknown. Furthermore, existing switching systems may periodically attempt to bring an out-of-service PRI back into service, so that call traffic can resume on the PRI upon removal of the loopback condition.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. A method for detecting a loopback condition on an ISDN primary rate interface ("PRI") by a telecommunications switching system, the method comprising the steps of:

storing a call reference value ("CRV") of a call SETUP command most recently transmitted onto a primary rate interface as a last sent call reference value;

determining that a command has been looped back on the primary rate interface when a call SETUP command is received requesting an occupied primary rate interface channel with a call reference value equal to the last sent call reference value;

incrementing a loop counter each time a command is looped back;

determining that a loopback condition exists on the primary rate interface when the value of the loop counter exceeds a predetermined threshold; and resetting the loop counter to zero when a valid response to a transmitted SETUP command is received on the primary rate interface.

2. The method of claim 1, which method further includes the step of resetting the loop counter to zero when a call SETUP command is received requesting a channel unoccupied on the primary rate interface, and when a call SETUP command is received with a call reference value not matching the last sent call reference value.

3. A method by which a telecommunications switching system with a plurality of ISDN primary rate interfaces can detect and respond to a loopback condition on a first ISDN primary rate interface with a plurality of channels, which method comprises the steps of:

storing a reference value of a call SETUP command most recently transmitted by the switching system onto the first primary rate interface as a last sent call reference value;

receiving an incoming call SETUP command on the first primary rate interface;

determining that an incoming a call SETUP command on the first primary rate interface has been looped back if it requests a channel that is occupied on the first primary rate interface and is assigned the same call reference value as the stored last sent call reference value;

incrementing a loop counter when an incoming call SETUP command on the first primary rate interface has been looped back;

setting the loop counter to zero when a valid response to a transmitted SETUP command is received on the first primary rate interface;

setting the loop counter to zero when an incoming call SETUP command requests a channel that is not occupied on the first primary rate interface;

setting the loop counter to zero when a call reference value of an incoming call SETUP command does not match the stored last sent call reference value;

determining that a loopback condition exists on the first primary rate interface when the value of the loop counter exceeds a predetermined threshold value;

removing the first primary rate interface from service upon determination that a loopback condition exist; and attempting periodically to bring the first primary rate interface back into service.

4. A method for responding to a loopback condition on an ISDN primary rate interface connection by a telecommunications switching system, the method comprising the steps of:

detecting by the switching system that a loopback condition is present on the primary rate interface by monitoring data communications on the primary rate interface;

wherein the step of detecting that a loopback condition is present comprises the substeps of:

storing a call reference value of a call SETUP command most recently transmitted onto the primary rate interface as a last sent call reference value;

determining that a command has been looped back on the primary rate interface when the call SETUP command is received requesting an occupied primary rate interface channel with a call reference value equal to the last sent call reference value;

incrementing a loop counter each time a command is looped back;

determining that a loopback condition exists on the primary rate interface when the value of the loop counter exceeds a predetermined threshold; and resetting the loop counter to zero when a valid response to a transmitted SETUP command is received on the primary rate interface;

removing the rate interface from service whereby the switching system will not attempt to route calls over the primary rate interface while it is removed from service;

attempting periodically to bring the primary rate interface back into service.

5. The method of claim 4, in which the step of detecting that a loopback condition is present comprises the substeps of:

determining that a loopback condition is present on the primary rate interface when a call SETUP command is received requesting an occupied primary rate interface channel with a call reference value equal to the last sent call reference value.

6. The method of claim 4 which method further includes the step of resetting the loop counter to zero when a call SETUP command is received requesting a channel unoccupied on the primary rate interface, and when a call SETUP command is received with a call reference value not matching the last sent call reference value.

* * * * *